(12) United States Patent
Allan (10) Patent No.: US 11,305,638 B2
(45) Date of Patent: Apr. 19, 2022

(54) RESERVOIR WITH LEVEL INDICATOR

(71) Applicant: ABC TECHNOLOGIES INC., Toronto (CA)

(72) Inventor: Richard Allan, Holland Landing (CA)

(73) Assignee: ABC TECHNOLOGIES INC., Toronto (CA)

( * ) Notice: Subject to any disclaimer, the term of this patent is extended or adjusted under 35 U.S.C. 154(b) by 205 days.

(21) Appl. No.: 16/620,045

(22) PCT Filed: Jun. 8, 2018

(86) PCT No.: PCT/CA2018/050687
§ 371 (c)(1),
(2) Date: Dec. 6, 2019

(87) PCT Pub. No.: WO2018/223239
PCT Pub. Date: Dec. 13, 2018

(65) Prior Publication Data
US 2020/0198457 A1    Jun. 25, 2020

Related U.S. Application Data

(60) Provisional application No. 62/516,983, filed on Jun. 8, 2017.

(51) Int. Cl.
*B60K 11/02*     (2006.01)
*G01F 23/58*     (2006.01)
(Continued)

(52) U.S. Cl.
CPC ............. *B60K 11/02* (2013.01); *F01P 11/029* (2013.01); *F01P 11/18* (2013.01); *G01F 23/58* (2013.01);
(Continued)

(58) Field of Classification Search
CPC ......... B60K 11/02; G01F 23/58; G01F 23/56; G01F 23/30; G01F 23/00;
(Continued)

(56) References Cited

U.S. PATENT DOCUMENTS 1,745,031 A  *  1/1930  Scott ....................... G01F 23/58
200/84 R
2016/0069726 A1     3/2016  Pettigrew
(Continued)

FOREIGN PATENT DOCUMENTS

KR        200165688 Y1      1/2000

OTHER PUBLICATIONS

International Search Report dated Sep. 18, 2018 in corresponding International Patent Application No. PCT/CA2018/050687.
(Continued)

*Primary Examiner* — Jacob M Amick
(74) *Attorney, Agent, or Firm* — Medler Ferro Woodhouse & Mills PLLC (57) ABSTRACT

Provided is fluid reservoir comprising a body having an inlet, an outlet, a fill aperture, and a fluid level indicator assembly. The fluid level indicator assembly is configured such at least an upper portion thereof extends external and above the body of the coolant reservoir. The fluid level indicator assembly includes a housing having a lower portion which extends into an interior volume of the body, and an upper portion, which is the portion that extends external and above the body.

20 Claims, 10 Drawing Sheets

(51) Int. Cl.
*F01P 11/02* (2006.01)
*F01P 11/18* (2006.01)

(52) U.S. Cl.
CPC ... *B60Y 2400/3019* (2013.01); *F01P 2025/70* (2013.01)

(58) Field of Classification Search
CPC . B60Y 2400/3019; F01P 11/029; F01P 11/02; F01P 11/0204; F01P 11/0209; F01P 11/18; F01P 11/14; F01P 2025/70
See application file for complete search history.

(56) References Cited

U.S. PATENT DOCUMENTS

2017/0350307 A1* 12/2017 Kerkewitz ............. F01P 11/029
2019/0070931 A1* 3/2019 Oh ....................... B60H 1/2221

OTHER PUBLICATIONS

Written Opinion of the international Searching Authority dated Sep. 18, 2018 in corresponding International Patent Application No. PCT/US PCT/CA2018/050687.

* cited by examiner

RESERVOIR WITH LEVEL INDICATOR

CROSS-REFERENCE TO RELATED APPLICATIONS

This application claims the benefit of U.S. Provisional Patent Application Ser. No. 62/516,983 filed 8 Jun. 2017, which is hereby incorporated by reference in its entirety for all purposes.

FIELD

The present disclosure pertains to automotive fluid reservoirs, in particular an automotive coolant reservoir with a top-mount level indicator.

BACKGROUND

An automobile will have a variety of fluid reservoirs (i.e. coolant reservoirs, washer fluid reservoirs, etc.) located in the engine compartment. Historically, these reservoirs were positioned at elevated locations in the engine compartment, to enable easy access and/or to permit for visual inspection, generally with respect to the fluid levels contained therein. For some fluid reservoirs, in particular those containing coolant fluid, a fluid level (i.e. Max/Min) indicator was provided on the side of the reservoir, to indicate a safe operational range for the fluid contained therein.

In modern engines, the engine compartment has undergone a considerable redesign, with the available packaging space for reservoirs becoming quite limited. Consequently, many reservoirs are now being located lower within the engine compartment, with oftentimes only the top portion of the reservoir being visible. In addition, many automotive manufacturers now incorporate an engine trim cover, not only to enhance the overall aesthetics of the engine compartment, but as a means for management of noise, temperature and a variety of other operational parameters.

As a result of these changes, it is becoming increasingly difficult for the operator to easily assess fluid levels. This could potentially lead to a low fluid level situation, which in certain cases (i.e. with coolant) could lead to engine damage and/or failure.

SUMMARY

According to an aspect of the disclosure, provided is fluid reservoir. The fluid reservoir comprises a body having an inlet, an outlet, a fill aperture, and a fluid level indicator assembly. The fluid level indicator assembly is configured such at least an upper portion thereof extends external and above the body of the coolant reservoir.

BRIEF DESCRIPTION OF THE DRAWINGS

The foregoing and other features and advantages of the disclosure will be apparent from the following description of the disclosure as illustrated in the accompanying drawings. The accompanying drawings, which are incorporated herein and form a part of the specification, further serve to explain the principles of the disclosure and to enable a person skilled in the pertinent art to make and use the disclosure. The drawings are not to scale.

FIG. 8b provides a cross-sectional view through line A-A of FIG. 8a.

FIG. 9b provides a cross-sectional view through line B-B of FIG. 9a.

FIG. 10a shows a second embodiment of the float assembly.

FIG. 10b provides a cross-sectional view through line C-C of FIG. 10a.

FIG. 10c provides a cross-sectional view through line D-D of FIG. 10a.

FIG. 10d provides a cross-sectional view through line E-E of FIG. 10a.

DETAILED DESCRIPTION

Specific embodiments of the present disclosure will now be described with reference to the Figures, wherein like reference numbers indicate identical or functionally similar elements. The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field, brief summary or the following detailed description.

Figure 1:
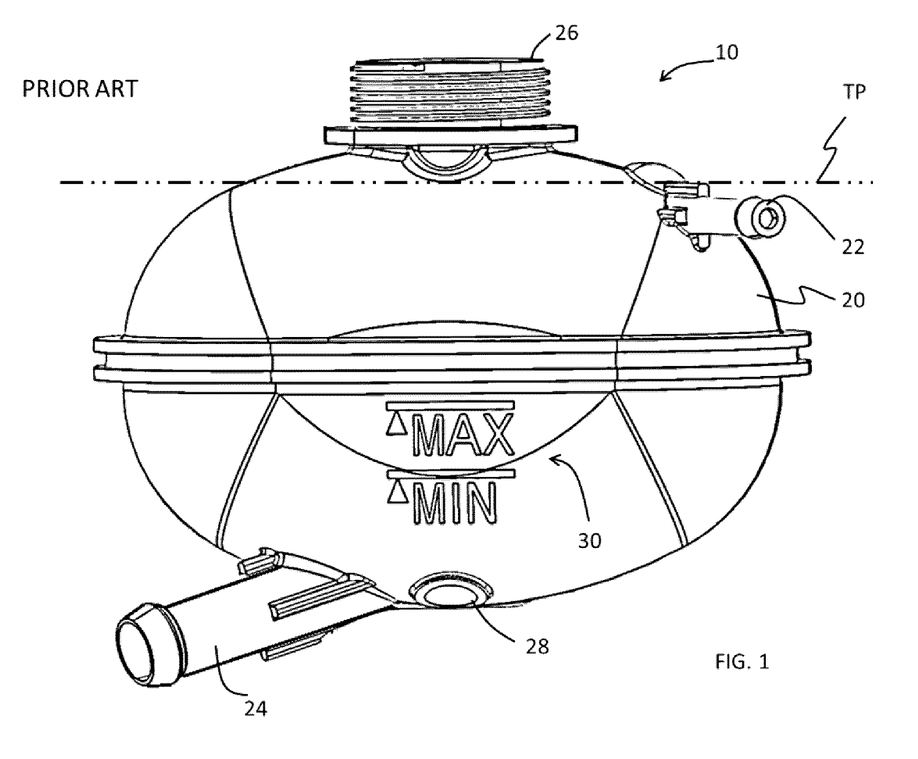
FIG. 1 is a perspective view of an exemplary prior art coolant reservoir.
Figure 2:
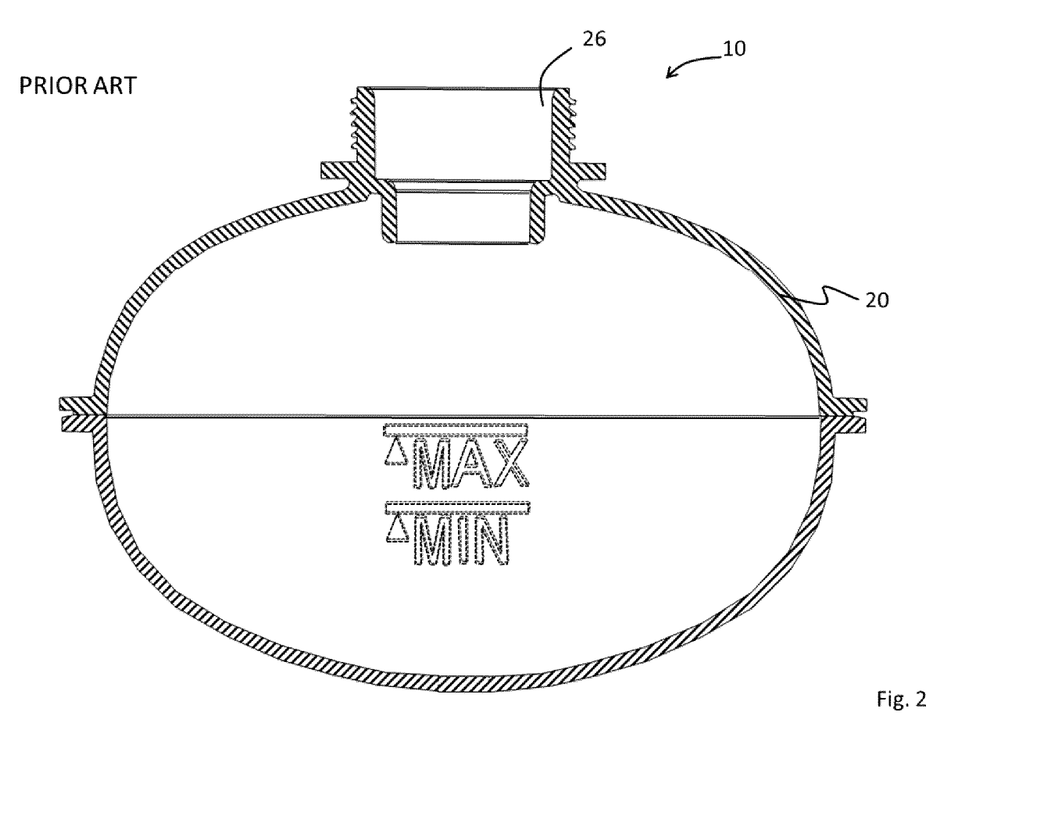
FIG. 2 is a side sectional view of the exemplary prior art coolant reservoir of FIG. 1.

Turning now to FIGS. 1 and 2, shown is an exemplary coolant reservoir 10 as would be typically found in an automotive coolant system. The coolant reservoir 10 (also referred to in the automotive arts as an expansion tank or a surge tank) includes a body 20 that defines an interior volume. The interior volume is configured to hold a select volume of engine coolant according to operational parameters of the engine in question. The body 20 presents an inlet 22 to receive coolant fluid into the interior volume, and an outlet 24 to release coolant fluid therefrom. By virtue of the inlet 22 and the outlet 24, the coolant reservoir 10 may form part of a closed fluid loop, for example as would be found in an automotive coolant system. The body 20 also presents a fill aperture 26 to permit for filling/emptying of the coolant reservoir 10 as needed. The area of the body 20 presenting the fill aperture 26 may be provided with a threaded or bayonet-style interface to receive a closure (i.e. a radiator-style pressure cap; not shown). Pressure caps are known in the art, and generally provide an internal valve arrangement (i.e. a spring loaded disc valve) that opens to permit the venting of fluid from the vessel when the pressure exceeds a predefined threshold. The pressure cap is generally configured to cooperate with a fluid release passage 28, which may be an internally formed conduit that directs vented fluid to an area below the body 20. In other arrangements, the pressure cap may be configured to release the vented fluid directly, generally to an area on top of the body 20. To assist in determining and ensuring the coolant system has the correct amount of coolant fluid in the system, a max/min fluid level indicator 30 is provided on the body 20. In prior art designs, the fluid level indicator 30 is provided directly upon on the body 20, often on a lower section thereof as shown in FIG. 1.

The coolant reservoir 10 is generally mounted within the engine compartment or other area of the vehicle where the operator has access to the fill aperture 26 and closure. Also considered in the placement of the coolant reservoir 10 is the ability of the operator to view the fluid level indicator 30. In some instances however, the placement of the coolant reservoir 10 presents certain challenges for accessibility, in particular with respect to viewing the fluid level indicator 30. For example, where the coolant reservoir is partially shrouded by a trim panel (shown in dot at TP), the fluid level indicator 30 may not be easily seen, or seen at all, without removal of the trim panel TP.

Figure 3:
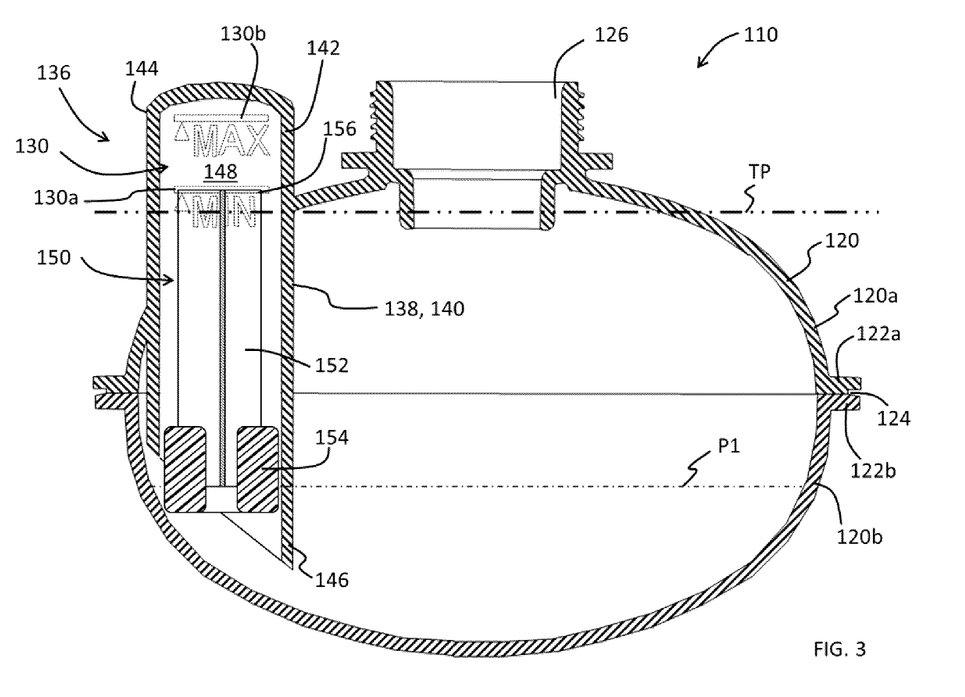
FIGS. 3 and 4 provide a side sectional view of a first embodiment of the coolant reservoir, showing the max/min positions of the fluid level indicator assembly.
Figure 4:
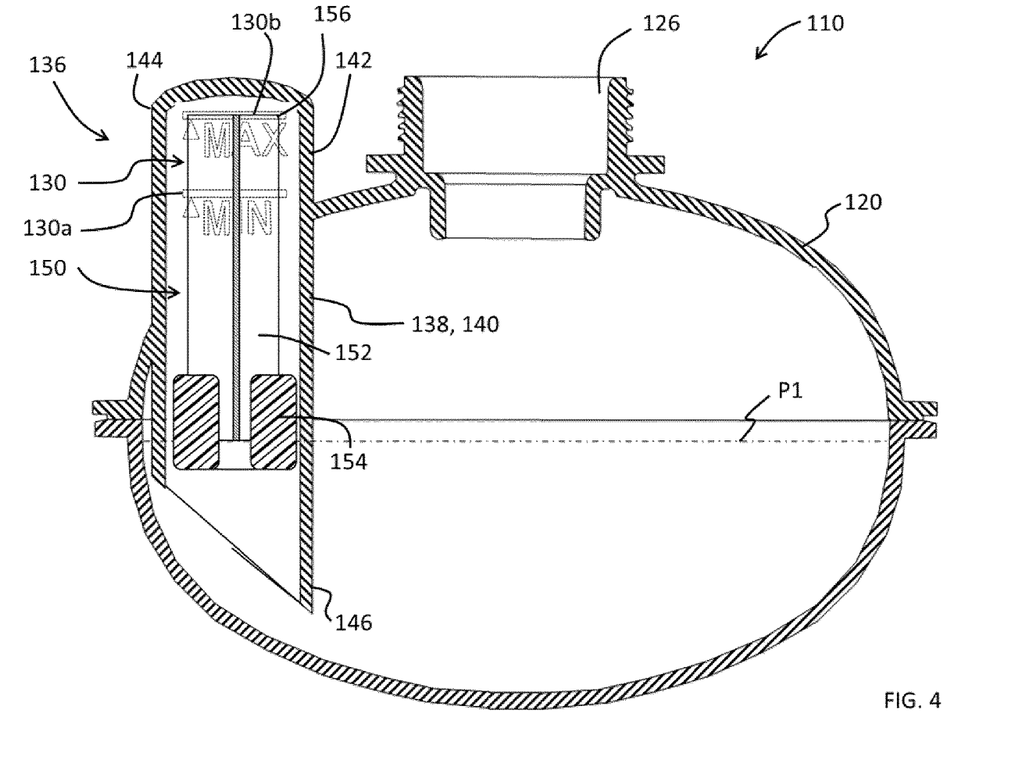

Turning now to FIGS. 3 and 4, shown is a coolant reservoir 110. The coolant reservoir 110 is generally constructed in a similar manner as the coolant reservoir 10. Accordingly, details on common features are omitted herein for sake of brevity. In general, the coolant reservoir 110 includes a body 120 which provides an inlet (not visible in the cross-section shown), and outlet (not visible in the cross-section shown), a fill aperture 126 (configured to receive a closure, which may or may not cooperate with a fluid release passage (not shown)). As shown, the body 120 includes an upper body section 120a and a lower body section 120b, the upper and lower body sections 120a, 120b each presenting a respective flange 122a, 122b between which the upper and lower body sections 120a, 120b are joined at an interface 124.

The coolant reservoir 110 provides a fluid level indicator assembly 136. The indicator assembly 136 includes a housing 138, a lower portion 140 of which extends into the interior volume of the body 120, and an upper portion 142, which extends external and above the body 120 as shown. As the coolant reservoir 110 is intended to operate under pressure, the housing 138 is sealed at the distal end 144 of the upper portion 142. On the opposite end, that is at the distal end 146 of the lower portion 140, the housing 138 is open such that the interior space 148 delimited by the housing 138 is in fluid communication with the interior volume of the body 120. Accordingly, the fluid level within the body 120, as well as any changes in fluid level that may occur will correspond to fluid levels in the housing 138. As shown, the walls defining the boundary of the housing 138 are aligned generally perpendicular to the plane P1 defined by the surface of the coolant fluid contained within the coolant reservoir 110. Stated differently, as the plane P1 will generally align to horizontal, the walls defining the boundary of the housing 138 will generally be vertical.

The fluid level indicator assembly 136 also provides a float assembly 150. The float assembly 150 includes a float body 152 and a buoyant member 154 attached to a lower portion of the float body 152. Float assembly 150 is positioned within the housing 138, and is dimensioned to permit for free displacement upward and downward therein. The displacement of the float assembly 150 is proportional to the coolant fluid level, through the buoyant action of the buoyant member 154 relative to the coolant fluid within the coolant reservoir 110. As coolant fluid levels increase within the coolant reservoir 110, the buoyant member 154 causes the float assembly 150 displaces proportionally upward within the housing 138 of the fluid level indicator assembly 136. Conversely, as the coolant fluid levels decrease within the coolant reservoir, the buoyant member 154 causes the float assembly 150 displaces proportionally downward within the housing 138 of the fluid level indicator assembly 136. Accordingly, the fluid level indicator assembly 136, in particular the upper portion 142 provides a max/min fluid level indicator 130. The float body 152 is dimensioned and calibrated such that a top region 156 thereof serves as an indicator reference point relative to the max/min fluid level indicator 130. It will be appreciated that the markings provided on the max/min fluid level indicator 130 will be selected based on the predetermined operational limits for maximum and minimum fluid levels.

Having regard to FIG. 3, the coolant reservoir 110 is shown with coolant fluid at a minimum operational limit. Accordingly, the top region 156 of the float body 152 is aligned to the MIN mark 130a. Having regard to FIG. 4, the coolant reservoir 110 is shown with coolant fluid at a maximum operational limit. Accordingly, the top region 156 of the float body 152 is aligned to the MAX mark 130b. It will be appreciated that with this arrangement, at least the upper portion 142 of the fluid level indicator assembly 136 is more easily inspected by the operator of the vehicle, in particular when a trim panel (denoted at TP) is positioned in a manner that partially covers the reservoir.

Figure 5:
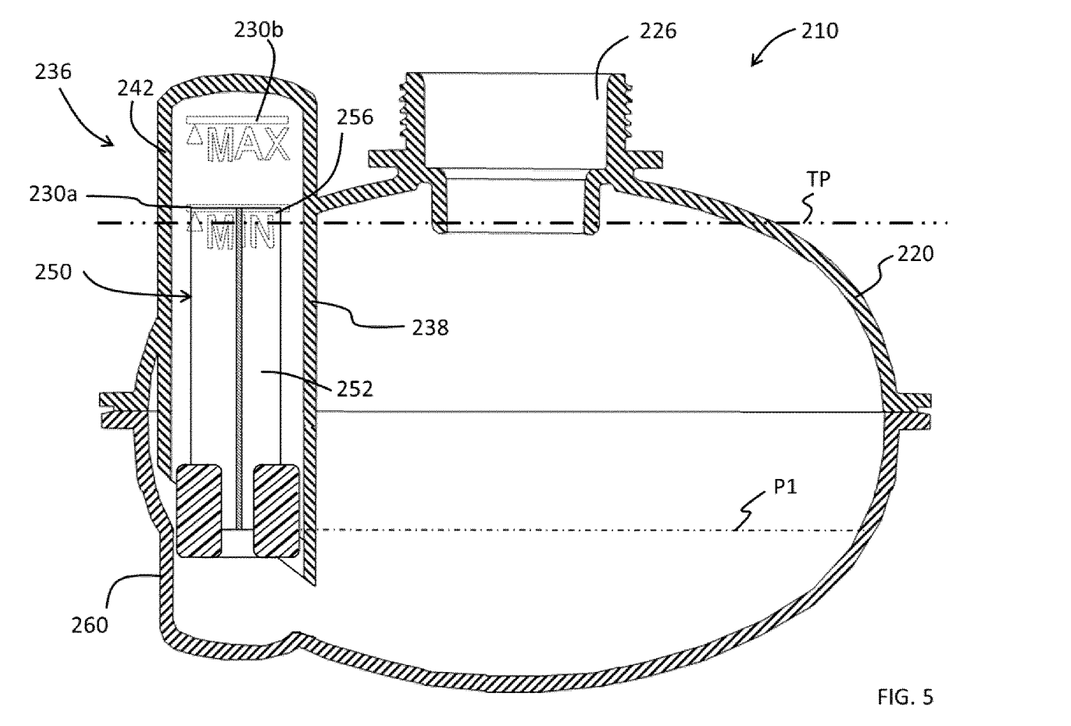
FIGS. 5 and 6 provide a side sectional view of a second embodiment of the coolant reservoir, showing the max/min positions of the fluid level indicator assembly.
Figure 6:
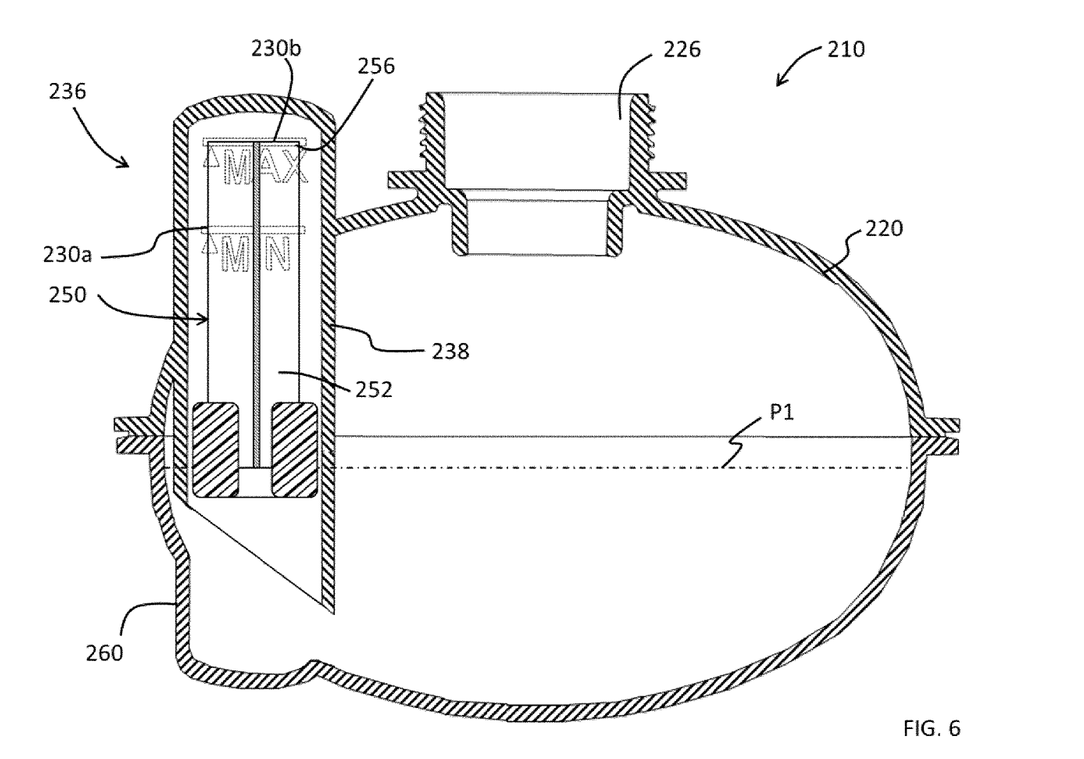

Turning now to FIGS. 5 and 6, shown is a coolant reservoir 210. The coolant reservoir 210 is generally constructed in a similar manner as the coolant reservoir 110. Accordingly, details on common features are omitted herein for sake of brevity. In general, the coolant reservoir 210 includes a body 220 which provides an inlet (not visible in the cross-section shown), and outlet (not visible in the cross-section shown), a fill aperture 226 (configured to receive a closure, which may or may not cooperate with a fluid release passage (not shown)). The coolant reservoir 210 also includes a fluid level indicator assembly 236. The indicator assembly 236 includes a housing 238 which is configured as previously described having regard to the housing 138 provided in the embodiment of FIGS. 3 and 4. The fluid level indicator assembly 236 similarly includes a float assembly 250, which once again is configured, dimensioned and arranged to operate as previously described having regard to the float assembly 150 provided in the embodiment of FIGS. 3 and 4.

In comparison to the coolant reservoir 110 of FIGS. 3 and 4, the coolant reservoir 210 of FIGS. 5 and 6 additionally provides a clearance pocket 260 formed as part of and extending below the body 220. The clearance pocket 260 is aligned to the walls forming the boundary of the housing 238, therein permitting for a greater range of displacement of the float assembly 250. The clearance pocket 260 may also be incorporated in coolant reservoirs that have a curved or otherwise shaped bottom that restricts the range of motion of the float assembly 250.

In all other respects, the coolant reservoir 210 operates as previously described having regard to coolant reservoir 110. Accordingly, having regard to FIG. 5, the coolant reservoir 210 is shown with coolant fluid at a minimum operational limit. Accordingly, a top region 256 of the float body 252 is aligned to the MIN mark 230a. Having regard to FIG. 6, the coolant reservoir 210 is shown with coolant fluid at a maximum operational limit. Accordingly, the top region 256 of the float body 252 is aligned to the MAX mark 230b. It will be appreciated that with this arrangement, at least the upper portion 242 of the fluid level indicator assembly 236 is more easily inspected by the operator of the vehicle, in particular when a trim panel (denoted at TP) is positioned in a manner that partially covers the reservoir.

Figure 7A:
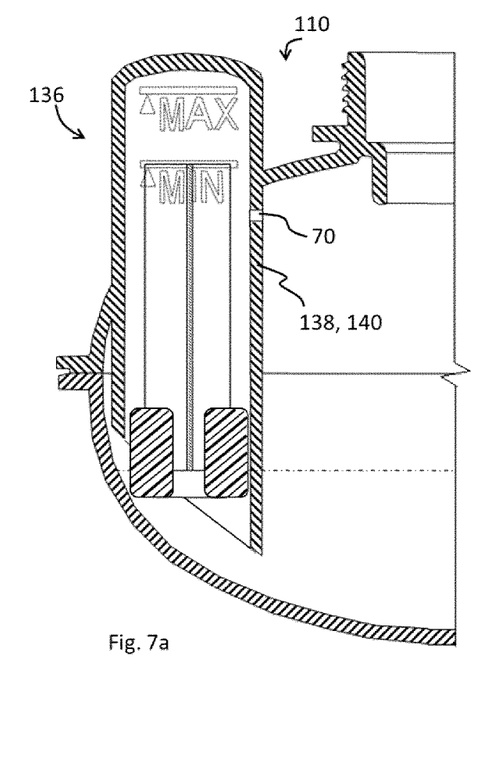
FIGS. 7a and 7b provide partial side sectional views of the coolant reservoirs according to the first and second embodiments, respectively, showing the addition of an aperture to provide headspace venting.
Figure 7B:
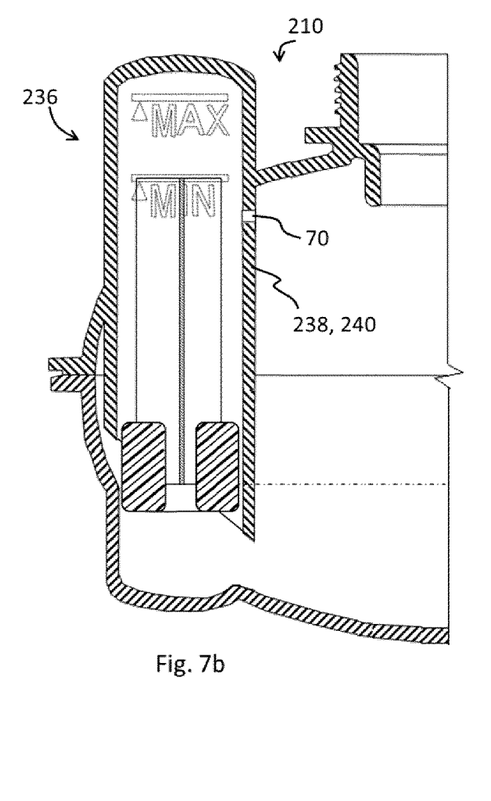

It will be appreciated that the coolant reservoirs 110, 210 may include additional features as deemed suitable for an intended purpose and application. For example, the fluid level indicator assembly, in particular an upper region of the lower portion of the housing that extends into the interior volume of the body may provide one or more apertures above the maximum permissible fluid level to facilitate headspace venting, and therein fluid level equilibrium relative to the fluid level in the interior volume of the body. As shown in FIG. 7a, the coolant reservoir 110, in particular the lower portion 140 of the housing 138 of the fluid level indicator assembly 136 is provided with an aperture 70. As shown in FIG. 7b, the coolant reservoir 210, in particular the lower portion 240 of the housing 238 of the fluid level indicator assembly 236 is similarly provided with aperture 70. Although coolant reservoirs 110, 210 are each shown as having a single aperture 70, it will be appreciated that the respective housing 138, 238 may in fact include a plurality of apertures.

The coolant reservoirs 110, 210 may additionally comprise a plurality of lobes provided on a lower region of an inside surface of the housing, to reduce the surface contact between the buoyant member and the inside surface. With specific reference to FIGS. 8a and 8b, a variation of the coolant reservoir 110 is shown (although a similar variation could be suitably implemented on coolant reservoir 210), where an inside surface 72 of the housing 138 is provided with a plurality of lobes 74. The plurality of lobes 74 are sized and positioned to provide sufficient clearance between the lobes 74 and an outside surface 76 of the buoyant member 154, to reduce the likelihood of the float assembly 150 binding within the housing. In the embodiment shown, a tri-lobe arrangement is used, although variations using a different number of lobes may be implemented. Although the lobes 74 are shown as elongate structures on the lower region of the inside surface 72, the lobes 74 may be shaped differently, for example as a plurality of conical protuberances.

Figure 8A:
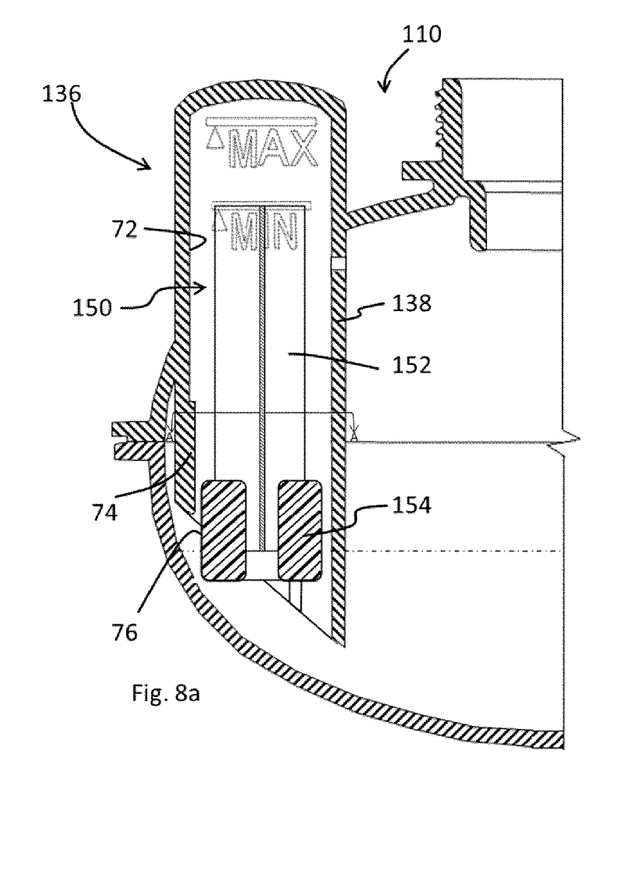
FIG. 8a provides a partial side sectional view of the coolant reservoir according to the first embodiment, showing the addition of a plurality of lobes to the inside surface of the housing of the fluid level indicator assembly.
Figure 8B:
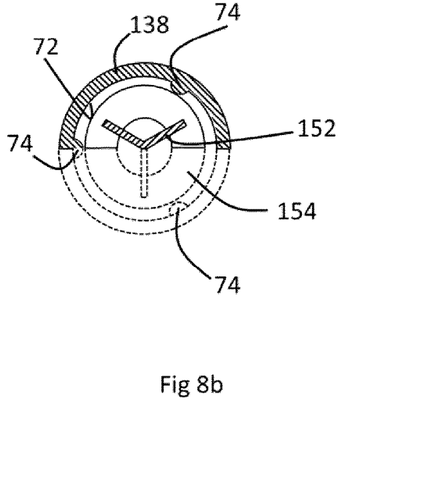
Figure 9A:
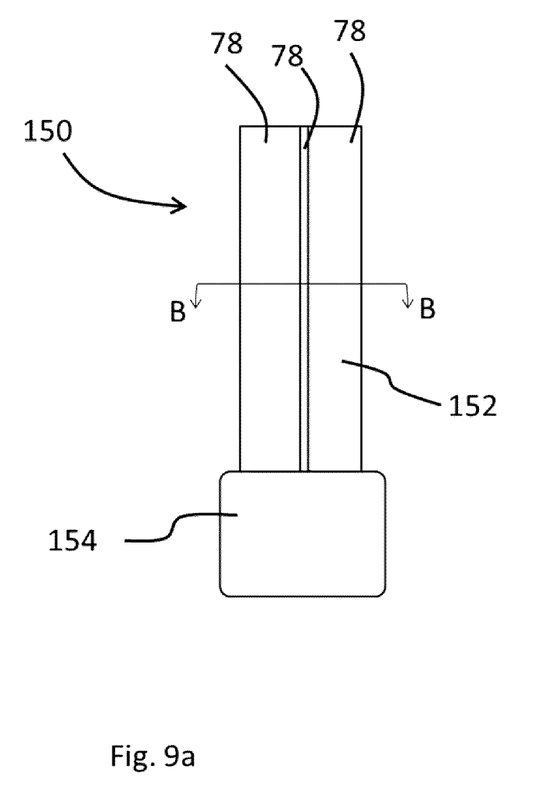
FIG. 9a shows a first embodiment of the float assembly.
Figure 9B:
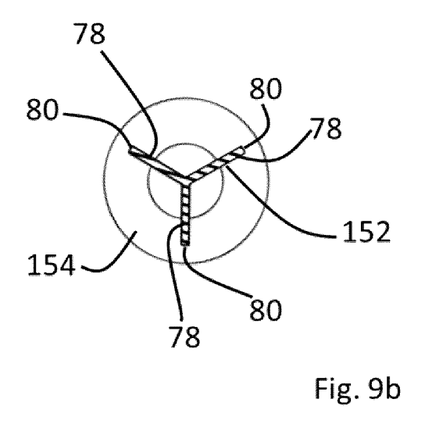

The coolant reservoirs 110, 210 are shown using a first embodiment of the float assembly 150. As stated previously, the float assembly 150 includes the float body 152 and the buoyant member 154 attached to the lower portion of the float body 152. With reference to FIG. 9a and the cross-sectional view of FIG. 9b, the float body 152 provides 3 body segments 78 in trigonal arrangement (taken in cross-section). Each body segment 78 presents a potential contact surface 80 with the inside surface 72 (as shown in FIG. 8a) of the housing 138, 238. In the embodiment shown, the radial measure of each body segment 78 is shortened sufficiently relative to the radial measure of the buoyant member 154 to reduce the likelihood of contact with the inside surface 72 during use. It will be appreciated, however, that the radial measure of each body segment 78 may be shorter or longer than that shown, to influence the extent of contact been the contact surface 80 and the inside surface 72 of the housing 138, 238.

Figures 10A, 10B, 10C, 10D:
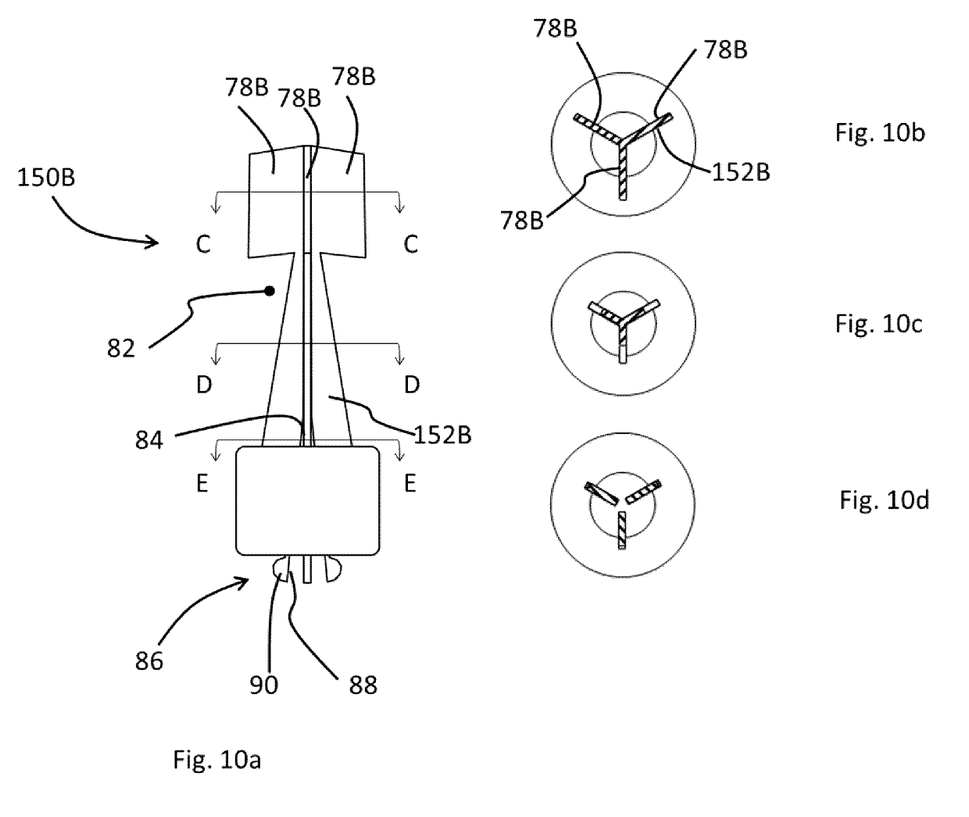

Referring now to FIGS. 10a to 10d, shown is a second embodiment of a float assembly 150B. The float assembly 150B is configured similarly to float assembly 150, with the exception that portions of the float body 152B are removed to lighten the construct. Compared to body segment 78 of the float assembly 150, the body segments 78B of the float assembly 150B include an outside cutout 82 and an inside cutout 84. In addition to lightening the construct, the outside cutout 82 on each body segment 78B further reduces the potential contact points between the float assembly 150B and the inside surface 72 of the housing 138, 238. The float body 152B also provides an attachment feature 86, where each body segment 78B is configured at an end thereof with a flexible leg 88 and attachment prong 90 which passes through a central aperture of the buoyant member 154 (generally provided as a cylindrical ring) and locks into place. FIGS. 10b through 10d provide cross-sectional views of the float assembly 150B at the locations noted.

The coolant reservoirs disclosed herein may be made of any suitable thermoplastic, including but not limited to polypropylene, polyethylene, and polycarbonate. The thermoplastic may also include various fillers known in the art, including but not limited to mineral fillers (i.e. calcium carbonate, talc, etc.) as well as additives, including but not limited to fibrous additives (i.e. glass fibers, carbon fibers, etc.). The embodiments as presented would be injection molded from two or more reservoir members with post-mold assembly, although alternative manufacturing methodologies may be suitably implemented to achieve the desired form. In some embodiments, the thermoplastic selected will be selected for a particular translucency/opacity characteristic, in particular to achieve a desired visibility of the float assembly in the fluid level indicator assembly. In some embodiments, the float assembly, in particular the float body or portions thereof may be colored or patterned to enhance visualization of the float assembly during use. For example, in some embodiments, the float body or an upper portion thereof may be colored orange. The buoyant member of the float assembly may be formed of any material that exhibits buoyancy relative to the fluid contained in the reservoir. For example, the buoyant member may be of hollow thermoplastic construction. The buoyant member may also be formed of foamed material.

Although the above disclosure has exemplified the technology with respect to coolant reservoirs, the addition of a fluid level indicator assembly as taught herein to other reservoir systems is also contemplated. For example, the fluid level indicator assembly may be suitably applied to brake fluid reservoirs, washer bottles, or any other fluid reservoir requiring a fluid level indicator that permits for viewing on an upper portion thereof. Despite exemplifying the technology with respect to automotive coolant reservoirs, there is no intention to restrict the teachings of the present disclosure to automotive coolant systems, as other automotive fluid systems may find useful application of the technology.

Relative terms should be construed as such. For example, the term "upper" is meant to be relative to the term "lower," the term "horizontal" is meant to be relative to the term "vertical", the term "top" is meant to be relative to the term "bottom", "inside" is relative to the term "outside", "upwards" is meant to be relative to the term "downwards", and so forth. Unless specifically stated otherwise, the terms "first," "second," "third," and "fourth" are meant solely for purposes of designation and not for order or for limitation.

While various embodiments have been described above, it should be understood that they have been presented only as illustrations and examples of the present disclosure, and not by way of limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. A fluid reservoir comprising:
   a body having an inlet, an outlet, a fill aperture, and a fluid level indicator assembly,
   wherein at least an upper portion of the fluid level indicator assembly extends external and above the body of the fluid reservoir, and
   wherein the fluid level indicator assembly includes a housing having a lower portion which extends into an interior volume of the body, and an upper portion, which is the portion that extends external and above the body, and
   wherein the fluid level indicator assembly includes a float assembly positioned within the housing, and is dimensioned to permit for free displacement upward and downward therein, and
   wherein the body includes a clearance pocket aligned to the housing, to provide for a greater range of displacement of the float assembly.

2. The fluid reservoir according to claim 1, wherein the housing is sealed at a distal end of the upper portion, and is open at a distal end of the lower portion, such that the housing delimits an interior space that is in fluid communication with the interior volume of the body.

3. The fluid reservoir according to claim 1, wherein the float assembly includes a float body and a buoyant member attached to a lower portion of the float body, the buoyant member enabling the displacement of the float assembly relative to fluid within the fluid reservoir.

4. The fluid reservoir according to claim 1, wherein the upper portion of the housing that extends external and above the body provides a fluid max/min level indicator, and a top region of the float body is dimensioned and calibrated to align with the fluid max/min level indicator provided on the housing to serve as an indicator of fluid level within the fluid reservoir.

5. The fluid reservoir according to claim 1, wherein the housing is integrally formed as part of an upper body section of the body, and wherein the lower portion of the housing extends into an area of the interior volume defined by a lower body section of the body.

6. A fluid reservoir comprising:
   a body having an inlet, an outlet, a fill aperture, and a fluid level indicator assembly,
   wherein at least an upper portion of the fluid level indicator assembly extends external and above the body of the fluid reservoir, and
   wherein the fluid level indicator assembly includes a housing having a lower portion which extends into an interior volume of the body, and an upper portion, which is the portion that extends external and above the body, and
   wherein the fluid level indicator assembly includes a float assembly positioned within the housing, and is dimensioned to permit for free displacement upward and downward therein, and
   wherein a plurality of lobes are provided on an inside surface of the housing, to prevent the float assembly from binding within the housing.

7. The fluid reservoir according to claim 3, wherein the float body includes three body segments provided in trigonal arrangement.

8. The fluid reservoir according to claim 3, wherein the buoyant member is constructed of foam, or as a hollow thermoplastic structure.

9. The fluid reservoir according to claim 1, wherein the fluid reservoir is an automotive coolant reservoir.

10. The fluid reservoir according to claim 6, wherein the housing is sealed at a distal end of the upper portion, and is open at a distal end of the lower portion, such that the housing delimits an interior space that is in fluid communication with the interior volume of the body.

11. The fluid reservoir according to claim 6, wherein the float assembly includes a float body and a buoyant member attached to a lower portion of the float body, the buoyant member enabling the displacement of the float assembly relative to fluid within the fluid reservoir.

12. The fluid reservoir according to claim 11, wherein the buoyant member is constructed of foam, or as a hollow thermoplastic structure.

13. The fluid reservoir according to claim 6, wherein the upper portion of the housing that extends external and above the body provides a fluid max/min level indicator, and a top region of the float body is dimensioned and calibrated to align with the fluid max/min level indicator provided on the housing to serve as an indicator of fluid level within the fluid reservoir.

14. The fluid reservoir according to claim 6, wherein the housing is integrally formed as part of an upper body section of the body, and wherein the lower portion of the housing extends into an area of the interior volume defined by a lower body section of the body.

15. The fluid reservoir according to claim 6, wherein the fluid reservoir is an automotive coolant reservoir.

16. A fluid reservoir comprising:
    a body having an inlet, an outlet, a fill aperture, and a fluid level indicator assembly,
    wherein at least an upper portion of the fluid level indicator assembly extends external and above the body of the fluid reservoir, and
    wherein the fluid level indicator assembly includes a housing having a lower portion which extends into an interior volume of the body, and an upper portion, which is the portion that extends external and above the body, and
    wherein the fluid level indicator assembly includes a float assembly positioned within the housing, and is dimensioned to permit for free displacement upward and downward therein, and
    wherein the float assembly includes a float body and a buoyant member attached to a lower portion of the float body, the buoyant member enabling the displacement of the float assembly relative to fluid within the fluid reservoir, and
    wherein the float body includes three body segments provided in trigonal arrangement.

17. The fluid reservoir according to claim 16, wherein the housing is sealed at a distal end of the upper portion, and is open at a distal end of the lower portion, such that the housing delimits an interior space that is in fluid communication with the interior volume of the body.

18. The fluid reservoir according to claim 16, wherein the buoyant member is constructed of foam, or as a hollow thermoplastic structure.

19. The fluid reservoir according to claim 16, wherein the upper portion of the housing that extends external and above the body provides a fluid max/min level indicator, and a top region of the float body is dimensioned and calibrated to align with the fluid max/min level indicator provided on the housing to serve as an indicator of fluid level within the fluid reservoir.

20. The fluid reservoir according to claim 16, wherein the housing is integrally formed as part of an upper body section of the body, and wherein the lower portion of the housing extends into an area of the interior volume defined by a lower body section of the body.

* * * * *